March 5, 1957  J. E. HAZELTINE, JR  2,784,113
FELT BASE FLOOR COVERING
Filed Dec. 27, 1950
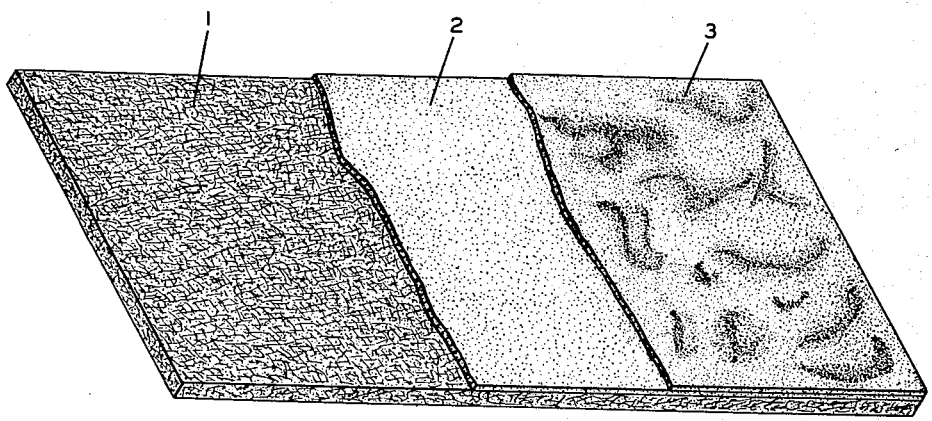
INVENTOR
JAMES E. HAZELTINE JR.
by
Walter F. Kaufman
ATTORNEY

United States Patent Office 2,784,113
Patented Mar. 5, 1957

2,784,113
FELT BASE FLOOR COVERING

James E. Hazeltine, Jr., Lancaster, Pa., assignor to Armstrong Cork Company, Lancaster, Pa., a corporation of Pennsylvania Application December 27, 1950, Serial No. 202,873

2 Claims. (Cl. 117—76)

This invention relates to felt base floor coverings. More particularly, the invention relates to an improved felt base floor covering comprised of a saturated felt backing, a coating paint containing a resinous copolymer of butadiene and styrene, and a decorative wearing surface applied upon the coating paint.

Felt base floor coverings are well known in the art. These floor coverings for the most part include a saturated felt backing material which is obtained by impregnating a felt with asphalt or resinous or rubberlike substances. In order to provide a smooth surface for receiving the decorative wearing surface, it is generally the practice to coat the saturated felt backing with what is known in the art as a coating paint. A number of materials have been used as coating paints and probably the most widely employed coating paint is an aqueous suspension of a resin-drying oil varnish. Generally speaking, rosin is the most widely used resin and linseed oil is the most widely used drying oil. However, other drying oils, such as soya bean oil, tung oil, oiticia oil, and the like, may be used in place of linseed oil; and other resins such as alkyd resins, ester gum, and the like, may be used in place of rosin. After the saturated felt backing has been coated with a coating paint, it is the practice to provide a decorative wearing surface. This may be any of a number of well-known enamels or resinous compositions which are suitable for use in obtaining decorative effects.

My invention is particularly concerned with a felt base floor covering of the type described above, in which the coating paint or first coat applied to the saturated felt contains a particular copolymer of butadiene and styrene. This copolymer is resinous in character rather than rubberlike and, generally speaking, contains at least 50% styrene. I have obtained particularly advantageous results utilizing a copolymer containing from about 60% to 75% styrene.

In accordance with my invention, a felt base floor covering is prepared by first passing a raw felt material through a saturating bath containing an asphalt saturant. The saturated felt is then coated with an aqueous suspension of resinous butadiene-styrene copolymer. After the coating has dried, the conventional decorative wearing surface is applied thereto. In order to understand my invention, reference may be had to the accompanying drawing, which is a perspective view partly broken away showing a floor covering made in accordance with my invention.

In the drawing, 1 is a saturated felt backing to which is applied the coating paint 2. The thus coated felt is then provided with a decorative wearing surface 3.

In producing the floor covering of my invention, the raw felt may be passed through a bath containing a suitable saturant such as asphalt. Thereafter the saturated felt may be coated by any suitable means, such as a roll coater with a film of the resinous butadiene-styrene coating paint. Although one coat may be used, it is advantageous to apply at least two coats. Each coat is dried before application of the succeeding coat. After application of the coating, a suitable decorative coating, which may be any known to the felt base floor covering art, is applied.

Generally speaking, it is desirable to incorporate filler and pigment with the coating.

A typical example of a coating paint utilized in the floor covering of my invention is the following:

Example I

| | Parts by weight |
|---|---|
| Latex of butadiene-styrene copolymer (60% styrene–40% butadiene)-45% solids | 41.7 |
| Red slate flour | 70.4 |
| Barden clay | 8.0 |
| Red oxide pigment | 1.6 |
| Water | 70.0 |

In producing the coating, the fillers and pigment are slurried in water and ground on a pebble mill. The latex is then added.

Wetting and dispersing agents and thickeners are advantageously added to adjust the viscosity of the paint to the requirements of the equipment chosen to apply the paint. The following example typifies the thickener, wetting, and dispersing agents used in a paint to be applied by a knife coater.

Example II

| | Parts by weight |
|---|---|
| Latex of butadiene-styrene copolymer (60% styrene–40% butadiene)-45% solids | 41.7 |
| Red slate flour | 70.4 |
| Barden clay | 8.0 |
| Red oxide pigment | 1.6 |
| Hydroxy ethyl cellulose (thickener) | 3.7 |
| Tetra sodium pyrophosphate (dispersing agent) | 1.2 |
| Polyalkylarylsulfonate (wetting agent) | 1.2 |
| Water | 70.0 |

In another embodiment of my invention the binder of the coating paint 2 is comprised of a drying oil varnish containing up to approximately 30% resinous butadiene-styrene copolymer. This composition is suspended in an aqueous medium and applied to the saturated felt.

A typical example of a coating paint embodying a drying oil varnish admixed with the resinous butadiene-styrene copolymer is as follows:

Example III

| | Parts by weight |
|---|---|
| Linseed oil varnish | 110 |
| Red slate flour | 674 |
| Barden clay | 50 |
| Tetra sodium pyrophosphate | 1 |
| Caustic soda | 3 |
| Aqueous ammonia (26° Baumé) | 5 |
| Latex of butadiene-styrene copolymer (60% styrene–40% butadiene)-45% solids | 135 |
| Water | 182 |

The drying oil varnish is emulsified in 110 parts of water by techniques well known to the art. The fillers and pigments are slurried in the emulsified drying oil varnish plus an aditional 72 parts of water. The tetrasodium pyrophosphate, caustic soda, and ammonia are added to the slurry and the latex of the butadiene-styrene copolymer is then added. The resulting mixture may then be ground on a pebble mill.

Felt base floor coverings made in accordance with my invention are characterized by excellent flexibility, freedom from asphalt stains, smooth surface, and other desirable properties. Such characteristics are due in large measure to the coating paint described herein. While I have described a coating paint, the binder of which contains about 70% drying oil varnish and about 30% resinous butadiene-styrene copolymer, it is to be understood that other proportions may, of course, be employed. In fact, if desired, the coating paint binder may consist entirely of an aqueous suspension of the copolymer; or, if asphalt sealing is the sole property required of the paint, the coating may consist of the aqueous suspension of the copolymer. Generally speaking, the desired results are not obtained when the binder contains less than about 20% of the copolymer. Thus, my invention in its broadest phase may be said to comprise a felt base floor covering having a saturated felt backing; an intermediate layer of coating paint, the binder of which contains at least about 20% butadiene-styrene copolymer; and a decorative wearing surface.

I claim:

1. A felt base floor covering comprising an asphalt saturated felt backing; a coating paint, the binder of which contains about 30% by weight of a resinous copolymer of butadiene and styrene containing at least 50% styrene and about 70% by weight of a drying oil varnish; and a decorative top coating.

2. A felt base floor covering comprising an asphalt saturated felt backing; an intermediate coating paint deposited from an aqueous suspension of pigment, filler, and binder, said binder containing about 30% by weight of a resinous copolymer of butadiene and styrene containing about 60% to 75% styrene; and about 70% by weight of a drying oil varnish and a decorative top coating.

References Cited in the file of this patent
UNITED STATES PATENTS

| | | |
|---|---|---|
| 2,133,886 | Beegle | Oct. 18, 1938 |
| 2,431,001 | Sullivan | Nov. 18, 1947 |
| 2,487,070 | Pike | Nov. 8, 1949 |
| 2,554,899 | Cowgill | May 29, 1951 |
| 2,624,682 | Hazeltine | Jan. 6, 1953 |
| 2,624,683 | Bezman | Jan. 6, 1953 |